US009847982B2

(12) United States Patent
Kääriäinen et al.

(10) Patent No.: US 9,847,982 B2
(45) Date of Patent: Dec. 19, 2017

(54) METHOD AND APPARATUS FOR PROVIDING AUTHENTICATION USING HASHED PERSONALLY IDENTIFIABLE INFORMATION

(71) Applicants: Teemu Kääriäinen, Espoo (FI); Jari Tapio Otranen, Espoo (FI)

(72) Inventors: Teemu Kääriäinen, Espoo (FI); Jari Tapio Otranen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 721 days.

(21) Appl. No.: 13/659,106

(22) Filed: Oct. 24, 2012

(65) Prior Publication Data

US 2013/0111570 A1    May 2, 2013

Related U.S. Application Data

(60) Provisional application No. 61/553,517, filed on Oct. 31, 2011.

(51) Int. Cl.
  *H04L 29/06* (2006.01)
  *H04L 9/32* (2006.01)
  *G06F 7/04* (2006.01)
  *G06F 15/16* (2006.01)
  *G06F 17/30* (2006.01)
  *H04L 9/08* (2006.01)

(52) U.S. Cl.
  CPC .......... *H04L 63/08* (2013.01); *H04L 9/3226* (2013.01); *H04L 63/126* (2013.01); *H04L 9/0866* (2013.01)

(58) Field of Classification Search
  None
  See application file for complete search history.

(56) References Cited

U.S. PATENT DOCUMENTS

| 7,551,913 B1 * | 6/2009 | Chien ........................... 455/411 |
| 2003/0126436 A1 * | 7/2003 | Greenberg ............ H04L 9/3271 713/168 |
| 2005/0251865 A1 * | 11/2005 | Mont et al. ..................... 726/26 |
| 2006/0085454 A1 | 4/2006 | Blegen et al. |

(Continued)

FOREIGN PATENT DOCUMENTS

WO   01/18631 A1   3/2001

OTHER PUBLICATIONS

Notification of Transmittal of the International Search Report and the Written Opinion of the International Searching Authority, or the Declaration for International Application No. PCT/FI2012/051039, dated Feb. 13, 2013, pp. 1-13.

*Primary Examiner* — Eric Chen
(74) *Attorney, Agent, or Firm* — Ditthavong & Steiner, P.C.

(57) ABSTRACT

An approach is provided for providing authentication using hashed personally identifiable information. The authentication platform processes and/or facilitates a processing of personally identifiable information associated with a device, a user of the device, or a combination thereof to cause, at least in part, a generation of hashed personally identifiable information. Next, the authentication platform causes, at least in part, a transmission of the hashed personally identifiable information to one or more network nodes in place of the personally identifiable information for use in one or more operations acting on the personally identifiable information.

20 Claims, 9 Drawing Sheets

(56) References Cited

U.S. PATENT DOCUMENTS

| | | | |
|---|---|---|---|
| 2006/0136985 A1* | 6/2006 | Ashley et al. ................... 726/1 | |
| 2007/0067626 A1* | 3/2007 | Louis Briancon et al. .. 713/168 | |
| 2007/0130343 A1* | 6/2007 | Pardo-Blazquez .......... H04L 29/12122 709/227 | |
| 2007/0250904 A1* | 10/2007 | Waller ............................. 726/1 | |
| 2008/0209205 A1 | 8/2008 | Rowley | |
| 2009/0327021 A1* | 12/2009 | Paknad ............................ 705/9 | |
| 2010/0082828 A1 | 4/2010 | Jennings et al. | |
| 2010/0281514 A1* | 11/2010 | Noh et al. ........................ 726/1 | |
| 2011/0010563 A1* | 1/2011 | Lee .................... G06F 21/6254 713/189 | |
| 2012/0005720 A1* | 1/2012 | McGloin et al. ................ 726/1 | |
| 2012/0110469 A1* | 5/2012 | Magarshak ............. H04L 9/321 715/747 | |
| 2012/0297441 A1* | 11/2012 | Boldyrev et al. ................ 726/1 | |
| 2013/0054780 A1* | 2/2013 | Bade et al. ................... 709/224 | |
| 2013/0139268 A1* | 5/2013 | An et al. ......................... 726/26 | |

\* cited by examiner

METHOD AND APPARATUS FOR PROVIDING AUTHENTICATION USING HASHED PERSONALLY IDENTIFIABLE INFORMATION

RELATED APPLICATIONS

This application claims benefit of the earlier filing date under 35 U.S.C. §119(e) of U.S. Provisional Application Ser. No. 61/553,517 filed Oct. 31, 2011, entitled "Method and Apparatus for Providing Authentication Using Hashed Personally Identifiable Information," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of services and technologies relating to account registration and management. For example, to reduce latencies associated with authentication, services can be hosted on multiple data centers to bring these services geographically closer to end-users. Because of the requirements of authentication, an end-user who has registered a user account with a site hosted at one data center typically must be able to authenticate at a site hosted at another data center where, for instance, the two sites are associated with the same service. However, such requirements can pose significant issues with regard to the privacy of end-users, especially with respect to the transmission of personally identifiable information associated with the end-users. Moreover, various jurisdictions prohibit the transfer of personally identifiable information to certain other jurisdictions (e.g., European Union prohibits the transfer of such information to China).

SOME EXAMPLE EMBODIMENTS

Therefore, there is a need for an approach for providing authentication using hashed personally identifiable information.

According to one embodiment, a method comprises processing and/or facilitating a processing of personally identifiable information associated with a device, a user of the device, or a combination thereof to cause, at least in part, a generation of hashed personally identifiable information. The method also comprises causing, at least in part, a transmission of the hashed personally identifiable information to one or more network nodes in place of the personally identifiable information for use in one or more operations acting on the personally identifiable information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of personally identifiable information associated with a device, a user of the device, or a combination thereof to cause, at least in part, a generation of hashed personally identifiable information. The apparatus is also caused to transmit the hashed personally identifiable information to one or more network nodes in place of the personally identifiable information for use in one or more operations acting on the personally identifiable information.

According to another embodiment, a computer-readable storage medium carries one or more sequences of one or more instructions which, when executed by one or more processors, cause, at least in part, an apparatus to process and/or facilitate a processing of personally identifiable information associated with a device, a user of the device, or a combination thereof to cause, at least in part, a generation of hashed personally identifiable information. The apparatus is also caused to transmit the hashed personally identifiable information to one or more network nodes in place of the personally identifiable information for use in one or more operations acting on the personally identifiable information.

According to another embodiment, an apparatus comprises means for processing and/or facilitating a processing of personally identifiable information associated with a device, a user of the device, or a combination thereof to cause, at least in part, a generation of hashed personally identifiable information. The apparatus also comprises means for causing, at least in part, a transmission of the hashed personally identifiable information to one or more network nodes in place of the personally identifiable information for use in one or more operations acting on the personally identifiable information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing authentication using hashed personally identifiable information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "personally identifiable information" may, for instance, include information that can be used, either alone or in combination with other sources, to uniquely identify an individual. Although various embodiments are described with respect to user identifiers, it is contemplated that the approach described herein may be used with respect to any other personally identifiable information. It is further noted that although various embodiments are described with respect to authentication-related operations, it is contemplated that the approach described herein may be used with respect to any other operations.

Figure 1:
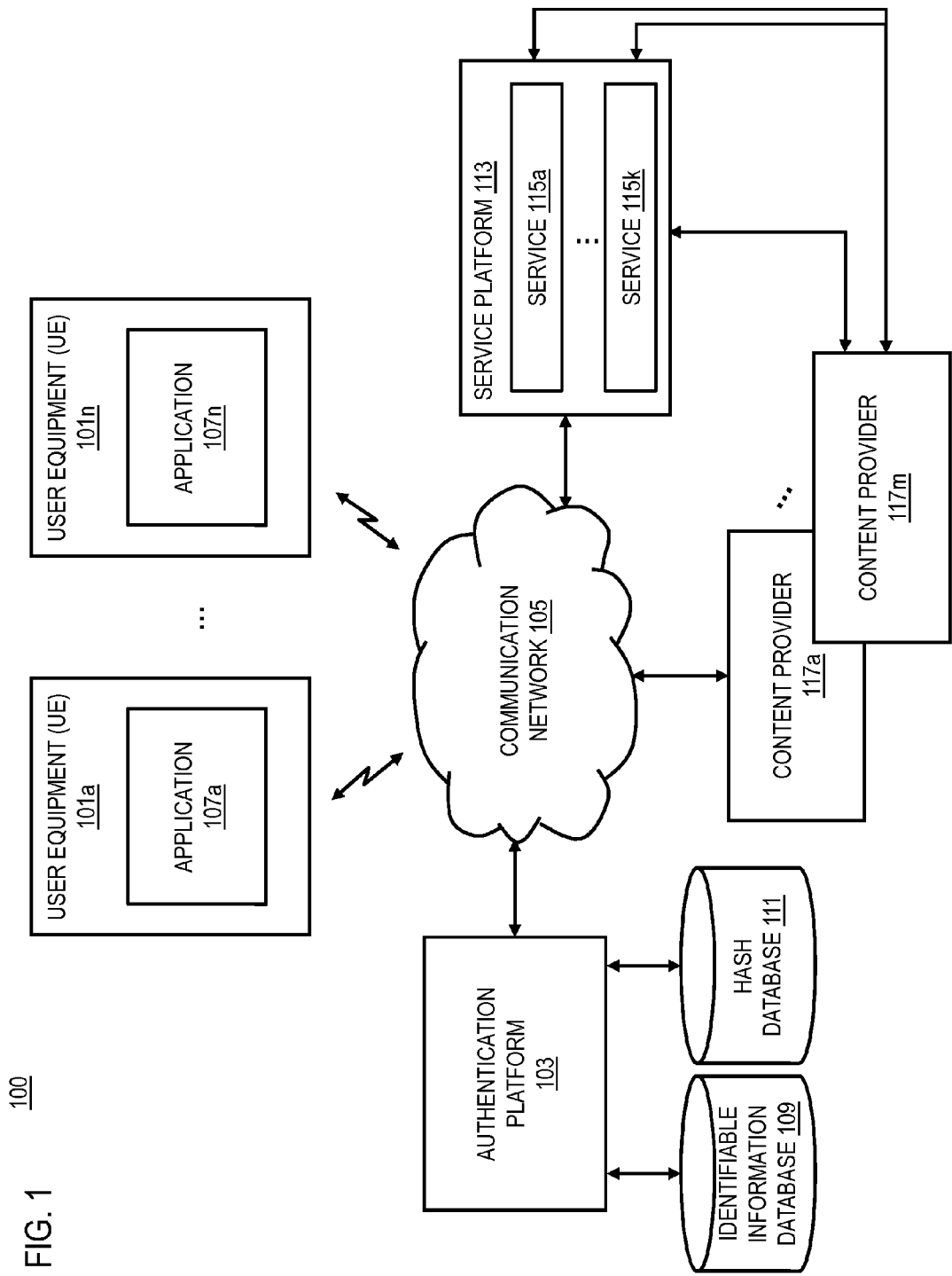
FIG. 1 is a diagram of a system capable of providing authentication using hashed personally identifiable information, according to one embodiment.

FIG. 1 is a diagram of a system capable of providing authentication using hashed personally identifiable information, according to one embodiment. As mentioned, service providers can reduce latencies associated with authentication by hosting their services at multiple data centers to bring their services geographically closer to their users, as compared with hosting their services at one data center. As part of authentication, users of a particular service are typically recognized by respective unique identifiers (e.g., username, email address, etc.) associated with that service. Because the service is hosted at multiple sites (e.g., multiple data center), users of the service must be recognized by the respective unique identifiers among the multiple sites. Moreover, access to a multi-site hosted authentication system may require either utilization of different uniform resource locators (URLs) to identify the individual authentication systems or utilization of global load balancers that use, for instance, an end-user's internet protocol (IP) address or cookies to determine which data center the authentication request should be forwarded to. However, replication of the respective unique identifiers at all of the different data centers, or the transmission of the end-user's IP address or cookies, can raise concerns with respect to user privacy, for instance, relating to the transmission of personally identifiable information to all of the different data centers. In addition, such replication or transmission can pose significant legal issues for the service provider. The European Union, for instance, prohibits the transmission of personally identifiable information from the European Union to China. Thus, the requirements of a multi-site authentication system (e.g., identifiers remaining unique between the different sites, transmission of information for identifying respective data centers, etc.) must still be satisfied while still maintaining user privacy and legal compliance.

To address this problem, a system 100 of FIG. 1 introduces the capability to provide authentication using hashed personally identifiable information, for instance, in place of personally identifiable information. Specifically, the system 100 may process the personally identifiable information associated with the device and/or the user to generate the hashed personally identifiable information. The hashed personally identifiable information may then be transmitted to various network nodes in place of the personally identifiable information for use in operations acting on the personally identifiable information. Additionally, or alternatively, the operations may include authentication operations associated with multi-site authentication for a number of services, and the network nodes may be associated with respective domains of the services (e.g., associated with various geographical domains of the services). In this way, the personally identifiable information remains protected since such information is not transmitted in clear text to the various network nodes (e.g., associated with untrusted domains). The hashed personally identifiable information may, for instance, be generated using multiple salts over multiple recursive iterations of a hash function to provide sufficient security of the personally identifiable information. Furthermore, for additional protection, the hashed personally identifiable information may include a one-way-hashed version of the personally identifiable information.

More specifically, the system 100 may process and/or facilitate a processing of personally identifiable information associated with a device, a user of the device, or a combination thereof to cause, at least in part, a generation of hashed personally identifiable information. The hashed personally identifiable information may, for instance, be generated in a number of ways. By way of example, the generation of the hashed personally identifiable information may be based, at least in part, on one or more salts. The generation of the hashed personally identifiable information may also include, at least in part, a number of recursive iterations of a hash function. Additionally, or alternatively, the hashed personally identifiable information may include, at least in part, a one-way-hashed version of the personally identifiable information. The system 100 may then cause, at least in part, a transmission of the hashed personally identifiable information to one or more network nodes in place of the personally identifiable information for use in one or more operations acting on the personally identifiable information. As indicated, the one or more operations may include one or more authentication operations associated with multi-site authentication for one or more services, and the one or more network nodes may be associated with respective one or more domains (e.g., geographical domains) of the one or more services.

As shown in FIG. 1, the system 100 comprises a user equipment (UE) 101 (or UEs 101a-101n) having connectivity to an authentication platform 103 via a communication network 105. The UE 101 may include or have access to an application 107 (e.g., applications 107a-107n) to enable the UE 101 to interact with, for instance, the authentication platform 103 to (a) process personally identifiable information to generate hashed personally identifiable information, (b) authenticate the device and/or the user of the device based on the hashed personally identifiable information, (c) process multi-site authentication for services associated with various network nodes and domains, (d) initiate operations relating to account registration and/or account management, (e) process authentication requests for the operations relating to account registration and/or account management, or (f) perform other functions. The authentication platform 103 may include or have access to an identifiable information database 109 to access or store personally identifiable information associated with one or more devices, one or more users of the respective devices, etc., along with other information relating to the personally identifiable information. The authentication platform 103 may also include or have access to a hash database 111 to access or store data relating to hash functions, hash tables, etc., that may be utilized to generate hashed personally identifiable information based on personally identifiable information. As discussed, hashed personally identifiable information may be provided to various network nodes in place of personally identifiable information for use in operations acting on the personally identifiable information. For example, the hashed personally identifiable information may be used to access content of a service platform 113, one or more services 115 (or services 115a-115k), or one or more content providers 117 (or content providers 117a-117m) that may be hosted or associated with the various network nodes. It is noted that the authentication platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the authentication platform 103 may determine whether to cause an initiation of the generation, the transmission, or a combination thereof of the hashed personally identifiable information based on one or more privacy policies associated with the one or more domains. As discussed, some jurisdictions have privacy-related laws that prohibit the transmission of personally identifiable information to various other jurisdictions. Thus, in one scenario, the privacy policies for data centers in jurisdictions with the privacy-related laws may correspond with such privacy-related laws. For example, since the European Union prohibits the transmission of personally identifiable information from the European Union to China, the privacy policies for data centers in the European Union may require that hashed personally identifiable information be transmitted in place of personally identifiable information to China for operations acting on the personally identifiable information. Accordingly, the generation, the transmission, and/or other operations of the hashed personally identifiable information (e.g., the complexity of the hashing salts, the number of recursive hashing iterations, the method of transmission, etc.) may be based on the privacy policies. It is noted that although various embodiments are described with respect to geographical domains, it is contemplated that the approach described herein may be used with respect to any other domain types. For example, other domain types may include virtual (or logical) domains that are separated based on hostnames, groups, etc.

In another embodiment, the authentication platform 103 may cause a replication of the hashed personally identifiable information at the one or more network nodes. The authentication platform 103 may then cause an initiation of the one or more operations based on the replication, the hashed personally identifiable information, or a combination thereof. By way of example, when registration of a user account of a particular service is approved, the hashed version of the user identifier associated with the user account may be transmitted to all of the network nodes that host the service. The hashed identifier may then be stored at each of the network nodes to prevent the registration of another user account for the particular service with the same user identifier (e.g., using hashed identifiers stored at each network node to determine whether another user has already registered with the desired user identifier). However, because the hashed identifier is transmitted and stored in place of the user identifier, the privacy of the user associated with the user identifier remains protected. Nonetheless, future operations (e.g., completion of registration, logins, modifications, etc.) that rely on the user identifier may be based on the replicated hashed identifiers stored at the respective network nodes. By way of another example, the hashed identifiers may be replicated at the network nodes for each of the respective domains. As such, the network nodes of any of the respective domains may then be able to process authentication requests (e.g., authentication of sessions for account management) using the hashed identifiers. Consequently, to reduce authentication-related latencies, the authentication requests may be processed at network nodes associated with domains closer to the user devices (or users) that initiate such requests.

In another embodiment, the authentication platform 103 may process and/or facilitate a processing of the hashed personally identifiable information to determine uniqueness information of the hashed personally identifiable information, the personally identifiable information, or a combination thereof, wherein the one or more operations are based, at least in part, on the uniqueness information. In a further embodiment, the uniqueness information may be synchronously determined among the one or more network nodes. In one scenario, a user in the European Union may initiate a request for registration of a desired user identifier with a particular service. Because the service may require that the user identifier be globally unique with respect to the service, the uniqueness of the user identifier must be checked at the network nodes at each of the respective domains. As such, although the user initiated the registration process in the European Union, the user identifier must be determined to be unique at data centers hosting the service in China as well data centers hosting the service in the European Union. To be in compliance with the privacy-related laws of the European Union, the desired user identifier is processed to generate a corresponding hashed identifier, which is thereafter transmitted to the data centers in China. The data centers in China may then, for instance, process the hashed identifier to determine whether the desired user identifier is unique with respect to the service at the data centers in China based on the hashed identifier. If, for instance, the data centers in China determine that desired user identifier is not unique, the user in the European Union may not be able to register for the desired user identifier with the service.

In a further scenario, reservation and/or registration of a desired user identifier (or other personally identifiable information) may be approved based on a predetermined number of responses from the various data centers (e.g., United States, European Union, China, etc.). For example, if the data centers hosting the service in the European Union and China both return a determination that the desired user identifier is unique with respect to the service at the respective data centers, the reservation and/or registration of the desired user identifier may be approved. That is, the reservation and/or registration need not be based on a response from all of the data centers hosting the service, especially if, for instance, the global uniqueness of user identifiers is ensured based on the replication of the hashed identifiers at the network nodes at each of the respective domains.

In another embodiment, the authentication platform 103 may determine an authentication request for the one or more operations, wherein the authentication request identifies at least one user identifier of the personally identifiable information, at least one passcode corresponding with the at least one user identifier, or a combination thereof. The authentication platform 103 may then process and/or facilitate a processing of the authentication request to determine an associated hashed identifier from the hashed personally identifiable information, an associated hashed passcode, or a combination thereof based, at least in part, on the at least one user identifier, the at least one passcode, or a combination thereof. The authentication platform 103 may further cause transmission of the associated hashed identifier, the associated hashed passcode, or a combination thereof to at least one of the one or more network nodes to determine whether to validate the authentication request.

By way of example, a particular service may be interconnected and hosted on a number of data centers in Countries X, Y, and Z. Country X may, for instance, prohibit transmission of personally identifiable information from within Country X to either Countries Y or Z. As such, the personally identifiable information of a user who registers for the service in Country X will not be replicated at the data centers in Countries Y or Z in clear text. Instead, the user's personally identifiable information (e.g., such as a user identifier) will be processed to generate hashed personally identifiable information, which will be transmitted in place of the personally identifiable information to the data centers in Countries Y or Z for replication. If, for instance, the user is now in Country Z and wishes to initiate an session to interact with the service, the user's UE 101 may determine (e.g., via the authentication platform 103 as part of application 107) that an authentication request has been initiated (e.g., by an application of the service on the UE 101). The authentication request may then be processed to determine a hashed identifier, of the hashed personally identifiable information, corresponding with the user identifier of the user as well as a hashed passcode corresponding with a passcode provided by the user. The hashed identifier and the hashed passcode may thereafter be transmitted to the data center in Country Z to validate the authentication request, for instance, by comparing the hashed identifier and the hashed passcode with hashed identifiers and hashed passcodes stored at the data center in Country Z.

In another embodiment, the authentication platform 103 may determine one or more namespaces associated with the personally identifiable information. The authentication platform 103 may then determine one or more hashing schemes corresponding with the one or more namespaces, wherein the generation of the hashed personally identifiable information is based, at least in part, on the one or more hashing schemes. In one use case, application logic may be used to perform various hashing schemes to generate the hashed personally identifiable information from the personally identifiable information, and multiple namespaces may be supported. Each namespace may also be assigned or associated with a particular hashing scheme for generating the hashed personally identifiable information. Thus, the hashed personally identifiable information may vary based on the namespace associated with the personally identifiable information.

By way of example, the UE 101, the authentication platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
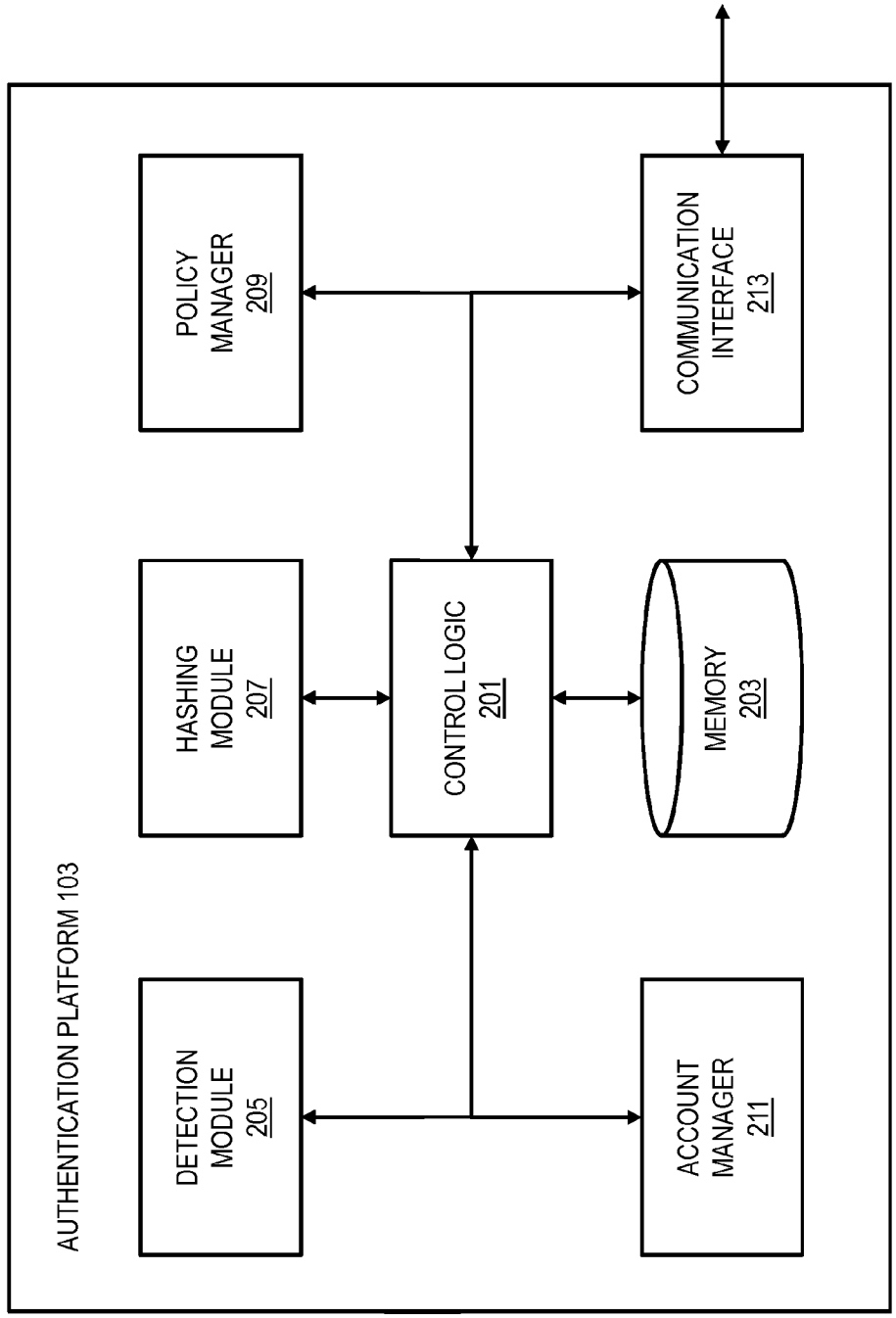
FIG. 2 is a diagram of the components of an authentication platform, according to one embodiment.

FIG. 2 is a diagram of the components of an authentication platform, according to one embodiment. By way of example, the authentication platform 103 includes one or more components for providing authentication using hashed personally identifiable information. It is contemplated that the functions of these components may be combined in one or more components or performed by other components of equivalent functionality. In this embodiment, the authentication platform 103 includes control logic 201, memory 203, a detection module 205, a hashing module 207, a policy manager 209, an account manager 211, and a communication interface 213.

The control logic 201 executes at least one algorithm for executing functions of the authentication platform 103. For example, the control logic 201 may interact with the detection module 205 to detect personally identifiable information from network information (e.g., prior to transmission of the network information to other network nodes). Upon detection, the control logic 201 may instruct the hashing module 207 to process the personally identifiable information to generate hashed personally identifiable information. As indicated, the hashing module 207 may perform hashing of personally identifiable information based on a variety of hashing schemes. Hashing schemes may include the use of various salts as well as any number of recursive iterations of a hash function (e.g., a one-way hash function). As such, the number of recursive iterations, the salts, and the hashing function associated with a hashing scheme may be determined to generate the hashed personally identifiable information. Moreover, as discussed, personally identifiable information may be associated with particular namespaces. Each of these namespaces may, for instance, correspond with particular hashing schemes. Thus, a hashing scheme may be selected for processing personally identifiable information based on the namespaces associated with the personally identifiable information.

The control logic 201 may also work with the policy manager 209 to implement, enforce, or monitor network policies (e.g., privacy policies, security policies, etc.). Network policies may, for instance, vary depending on the domains of a particular service since requirements with respect to the level of security, the hashing scheme, etc., that are to be utilized may differ among the various domains. In one scenario, the policy manager 209 may define, for the detection module 205, network information that should be detected as personally identifiable information. In addition, the policy manager 209 may provide the hashing module 207 with a list of hashing schemes that may be used as well as the necessary level of security that should be provided for transmission of network information.

The control logic 201 may additionally interact with the account manager 211 to handle account-related operations (e.g., registrations, logins, modifications, etc., with respective services). As an example, the account manager 211 may handle a registration request for a desired user identifier by initially processing a corresponding hashed identifier to synchronously determine uniqueness information of the hashed identifier and/or the user identifier among associated network nodes. If, for instance, the hashed identifier and/or the user identifier are determined to be unique, then the account manager 211 may approve the registration request for the user identifier. On the other hand, if the hashed identifier and/or the user identifier are determined not to be unique, the account manager 211 may notify the user who initiated the registration request that the desired user identifier is not available, or recommend other actions for the user (e.g., registration with similar user identifiers that are available). In addition, the account manager 211 may also handle possible conflict detection and conflict resolution in cases where the authentication system in a multi-site setup has caused duplicate information to be stored when uniqueness should be enforced.

The control logic 201 may further utilize the communication interface 213 to communicate with other components of the authentication platform 103, the UEs 101, the service platform 113, the services 115, the content providers 117, and other components of the system 100. For example, the communication interface 213 may transmit hashed personally identifiable information to the various network nodes hosting the associated services 115 of the service platform 113. The communication interface 213 may further include multiple means of communication. In one use case, the communication interface 213 may be able to communicate over SMS, MMS, internet protocol, instant messaging, voice sessions (e.g., via a phone network), or other types of communication.

Figure 3:
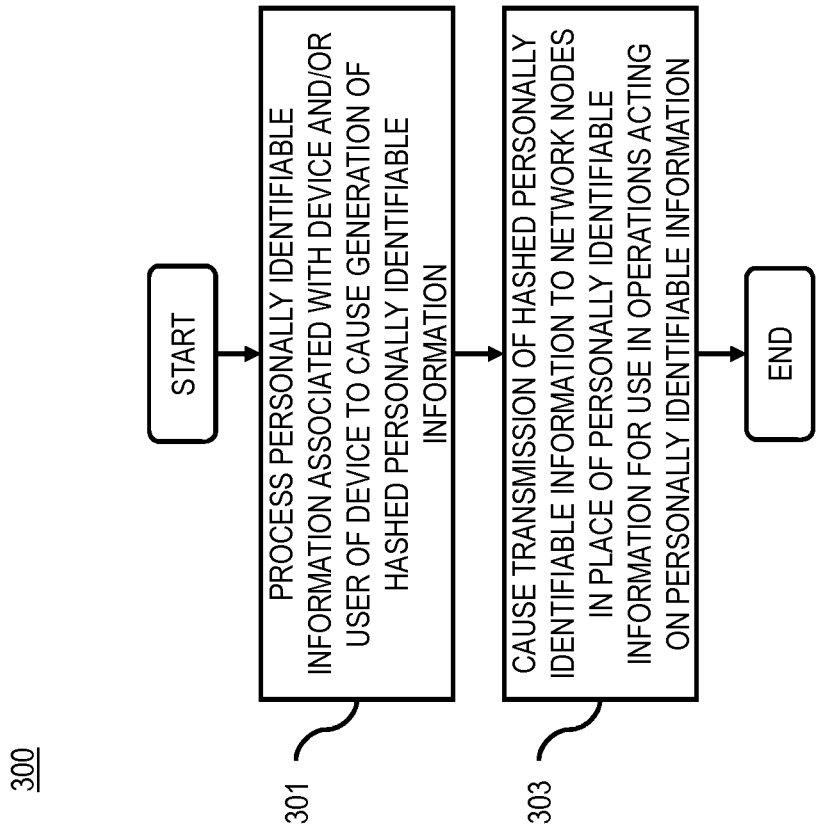
FIG. 3 is a flowchart of a process for providing authentication using hashed personally identifiable information, according to one embodiment.
Figure 8:
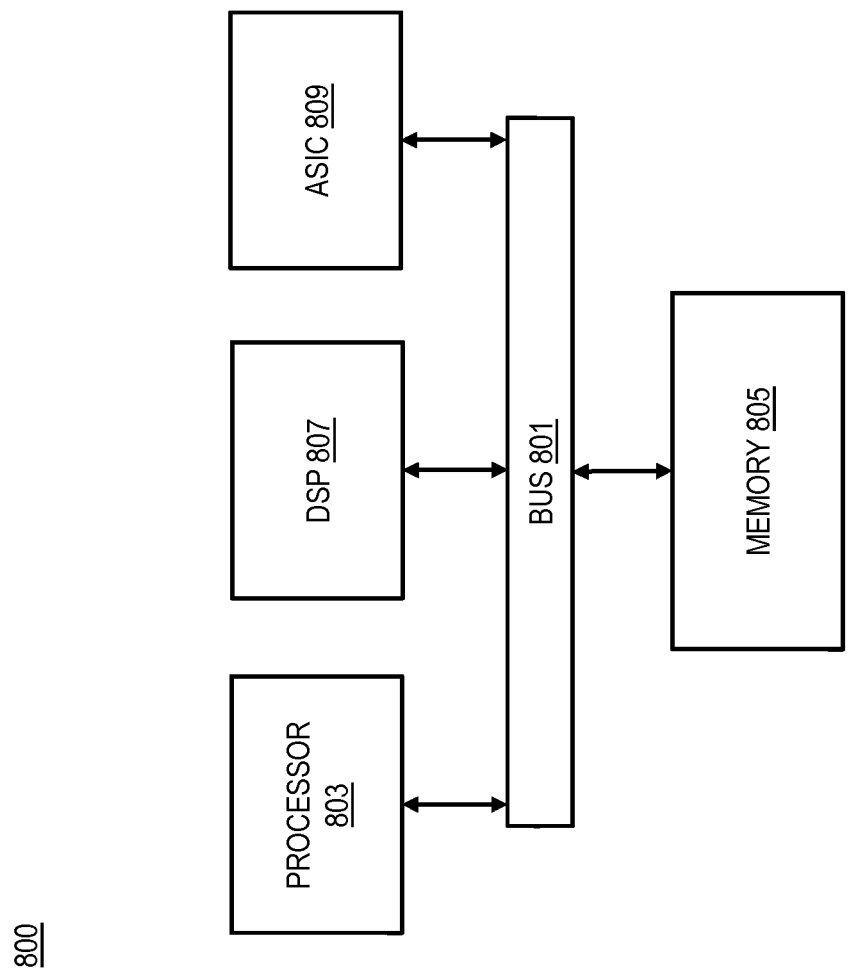
FIG. 8 is a diagram of a chip set that can be used to implement an embodiment of the invention.

FIG. 3 is a flowchart of a process for providing authentication using hashed personally identifiable information, according to one embodiment. In one embodiment, the authentication platform 103 performs the process 300 and is implemented in, for instance, a chip set including a processor and a memory as shown in FIG. 8. As such, the control logic 201 can provide means for accomplishing various parts of the process 300 as well as means for accomplishing other processes in conjunction with other components of the authentication platform 103.

In step 301, the control logic 201 may process and/or facilitate a processing of personally identifiable information associated with a device, a user of the device, or a combination thereof to cause, at least in part, a generation of hashed personally identifiable information. As mentioned, the hashed personally identifiable information may be generated in a number of ways. By way of example, the generation of the hashed personally identifiable information may be based, at least in part, on one or more salts. The generation of the hashed personally identifiable information may also include, at least in part, a number of recursive iterations of a hash function. Additionally, or alternatively, the hashed personally identifiable information may include, at least in part, a one-way-hashed version of the personally identifiable information.

In step 303, the control logic 201 may cause, at least in part, a transmission of the hashed personally identifiable information to one or more network nodes in place of the personally identifiable information for use in one or more operations acting on the personally identifiable information. The one or more operations may, for instance, include one or more authentication operations associated with multi-site authentication for one or more services, and the one or more network nodes may be associated with respective one or more domains of the one or more services.

Figure 4:
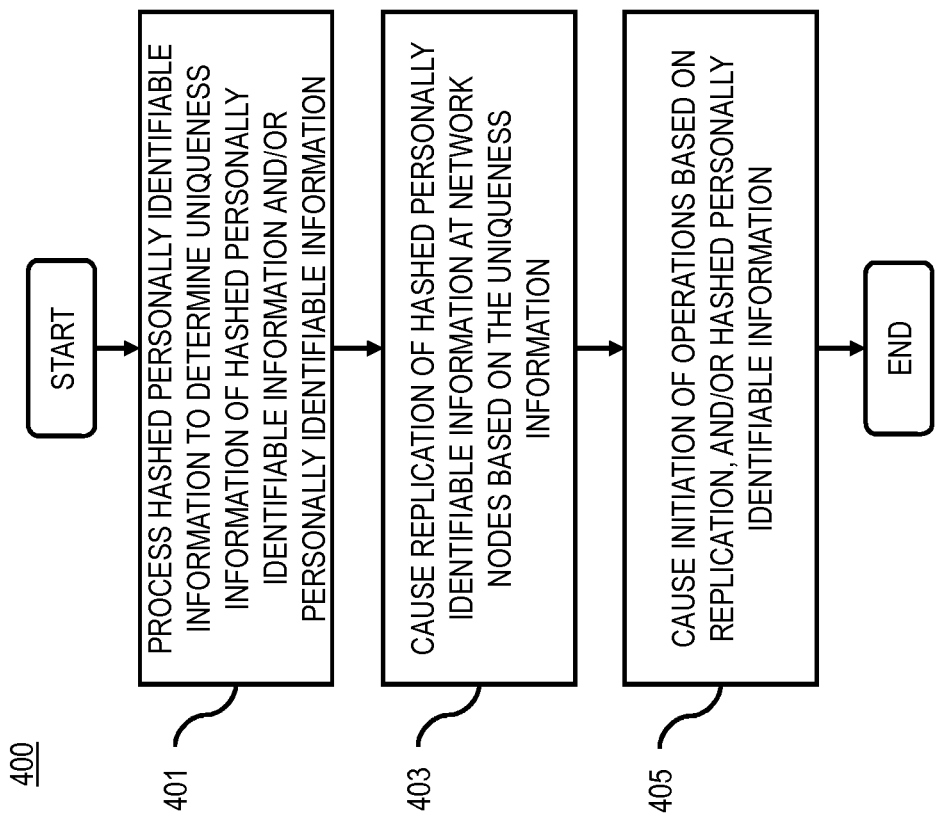
FIG. 4 is a flowchart of a process for initiating operations, according to one embodiment.

FIG. 4 is a flowchart of a process for initiating operations, according to one embodiment. In one embodiment, the authentication platform 103 performs the process 400 and is implemented in, for instance, a chip set including a processor and a memory as shown in FIG. 8. As such, the control logic 201 can provide means for accomplishing various parts of the process 400 as well as means for accomplishing other processes in conjunction with other components of the authentication platform 103.

In step 401, the control logic 201 may process and/or facilitate a processing of the hashed personally identifiable information to determine uniqueness information of the hashed personally identifiable information, the personally identifiable information, or a combination thereof. By way of example, the hashed personally identifiable information may be transmitted to each of the one or more network nodes to determine whether the hashed personally identifiable information is already stored at the one or more network nodes. If, for instance, the hashed personally identifiable information is not stored at the one or more network nodes, then the personally identifiable information may be determined to be unique. As discussed, the uniqueness determination may be necessary to prevent multiple registrations of the same user identifiers (or other personally identifiable information), for instance, for a particular service.

In step 403, the control logic 201 may cause, at least in part, a replication of the hashed personally identifiable information at the one or more network nodes based on the uniqueness information. As mentioned, the hashed personally identifiable information transmitted to each of the one or more network nodes may be stored at the one or more network nodes to replicate the hashed personally identifiable information. As such, in step 405, the control logic 201 may cause, at least in part, an initiation of the one or more operations based, at least in part, on the replication, the hashed personally identifiable information, or a combination thereof. Future operations, such as registrations, logins, modifications, etc., may, for instance, be initiated and compared against the replicated information at the one or more network nodes.

Figure 5:
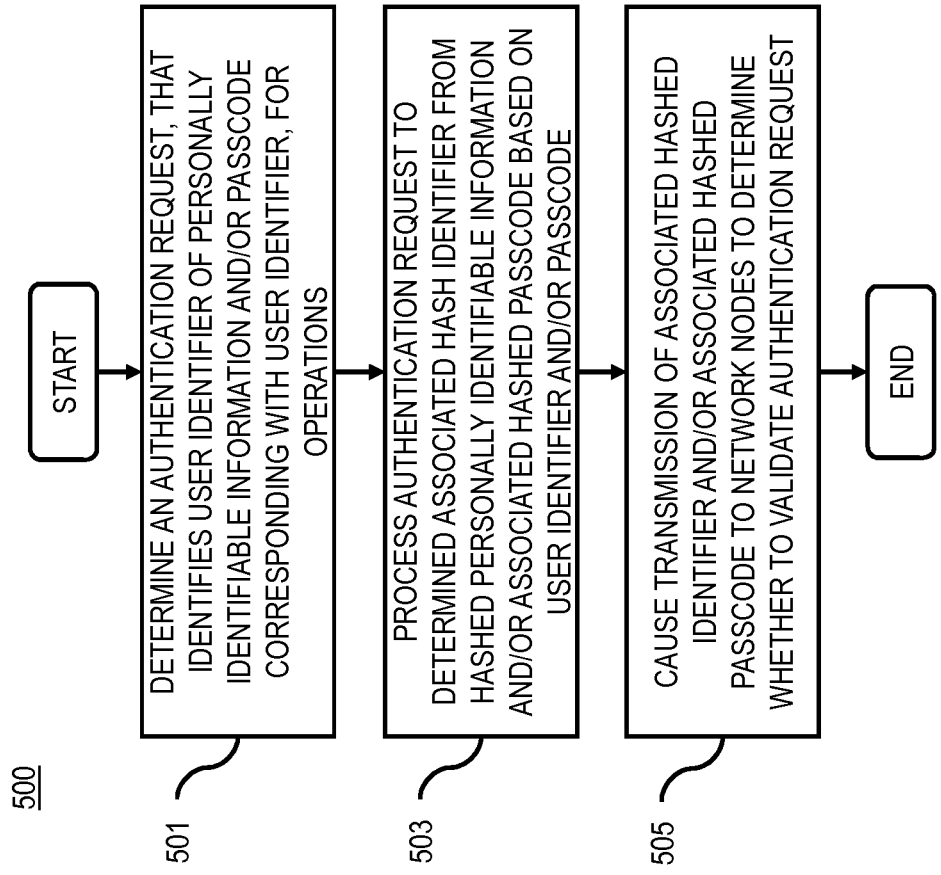
FIG. 5 is a flowchart of a process for validating authentication requests, according to one embodiment.

FIG. 5 is a flowchart of a process for validating authentication requests, according to one embodiment. In one embodiment, the authentication platform 103 performs the process 500 and is implemented in, for instance, a chip set including a processor and a memory as shown in FIG. 8. As such, the control logic 201 can provide means for accomplishing various parts of the process 500 as well as means for accomplishing other processes in conjunction with other components of the authentication platform 103.

In step 501, the control logic 201 may determine an authentication request for the one or more operations, wherein the authentication request identifies at least one user identifier of the personally identifiable information, at least one passcode corresponding with the at least one user identifier, or a combination thereof. The control logic 201 may then, as in step 503, process and/or facilitate a processing of the authentication request to determine an associated hashed identifier from the hashed personally identifiable information, an associated hashed passcode, or a combination thereof based, at least in part, on the at least one user identifier, the at least one passcode, or a combination thereof. By way of example, the at least one user identifier and/or the at least one passcode may be utilized to determine, via one or more hashing schemes, the associated hashed identifier and/or the associated hashed passcode.

In step 505, the control logic 201 may cause, at least in part, transmission of the associated hashed identifier, the associated hashed passcode, or a combination thereof to at least one of the one or more network nodes to determine whether to validate the authentication request. In one scenario, a user attempting to access an account of a certain service while in a particular country may provide a username and a password to an application associated with the service. The application may then transmit a hashed version of the username and a hashed version of the password to a data center hosting the service in the particular country for comparison of the transmitted hashed information against information stored at the data center. If, for instance, a match exists, the data center may validate the authentication request. Otherwise, the authentication request may be denied.

Figure 6:
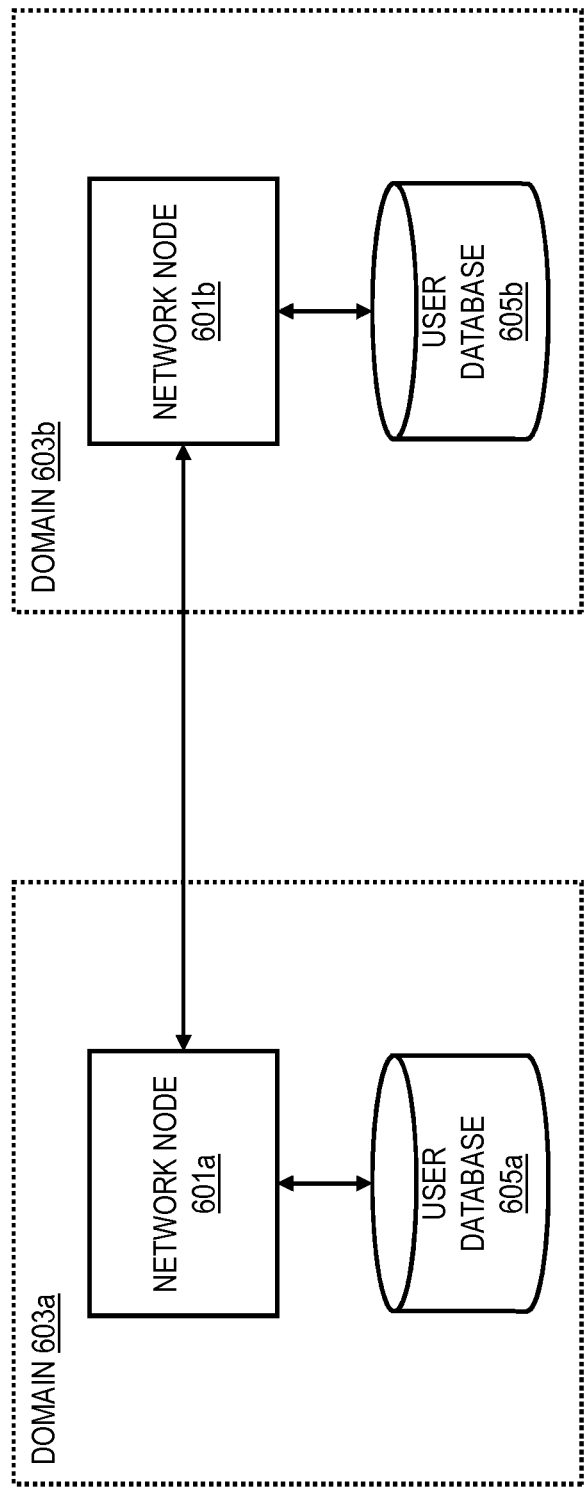
FIG. 6 is a diagram of operations occurring between two network nodes associated with respective domains, according to one embodiment.

FIG. 6 is a diagram of operations occurring between two network nodes associated with respective domains, according to one embodiment. As shown, the operations are occurring between network nodes 601a and 601b of respective domains 603a and 603b. In one scenario, when a user in domain 603a provides personally identifiable information while registering with a particular service (e.g., hosted at the network nodes 601a and 601b), the personally identifiable information (e.g., username, email address, etc.) may be processed to generate hashed personally identifiable information. Some of the hashed personally identifiable information (e.g., corresponding with username, email address, etc.) may then be transmitted from the network node 601a to the network node 601b to determine whether the personally identifiable information is unique by comparing the transmitted information with information stored at the network node 601b (e.g., in user database 605b). During the same period, either the personally identifiable information or the hashed identifiable information may also be utilized at the network node 601a to determine whether the personally identifiable information is unique by comparing the information with information stored at the network node 601a (e.g., in user database 605a). If, for instance, the personally identifiable information is determined to be unique, then the personally identifiable information and/or the hashed personally identifiable information may be saved at the network node 601*a* in the user database 605*a*. In addition, the rest of the hashed personally identifiable information (not yet transmitted) may be transmitted to the network node 601*b* to replicate the hashed personally identifiable information at the network node 601*b* in the user database 605*b*. In this way, the transmission of the personally identifiable information in clear text may be avoided while maintaining uniqueness among the various data centers by transmitting the hashed personally identifiable information in place of the personally identifiable information. It is also noted that the multi-site authentication system may further utilize a queue for replication of hashed personally identifiable information. For example, if one of the data centers in the multi-site setup is down (or currently offline), the data to be replicated can be placed into a queue for transmission to the data center when the data center comes back online.

The processes described herein for providing authentication using hashed personally identifiable information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
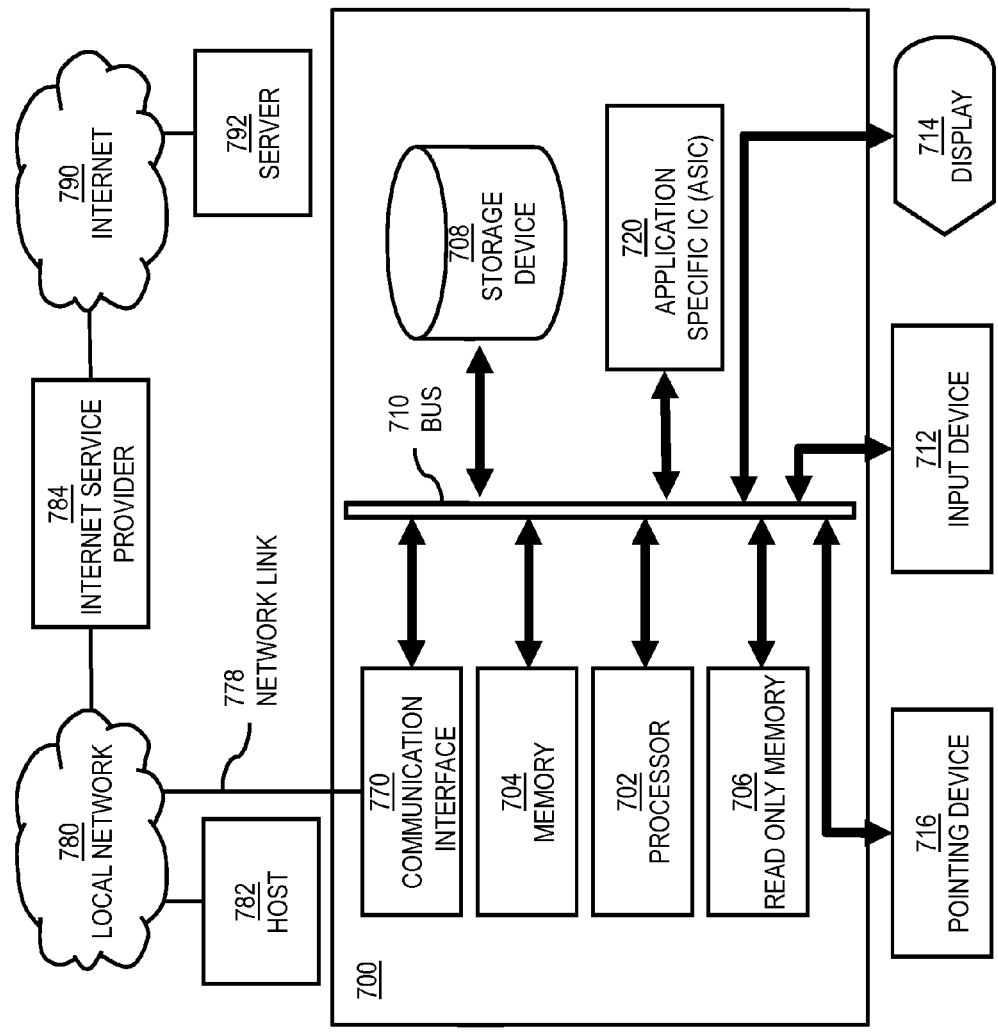
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide authentication using hashed personally identifiable information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing authentication using hashed personally identifiable information.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing authentication using hashed personally identifiable information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing authentication using hashed personally identifiable information. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing authentication using hashed personally identifiable information, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing authentication using hashed personally identifiable information to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide authentication using hashed personally identifiable information as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing authentication using hashed personally identifiable information.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide authentication using hashed personally identifiable information. The memory 805 also stores the data associated with or generated by the execution of the inventive steps.

Figure 9:
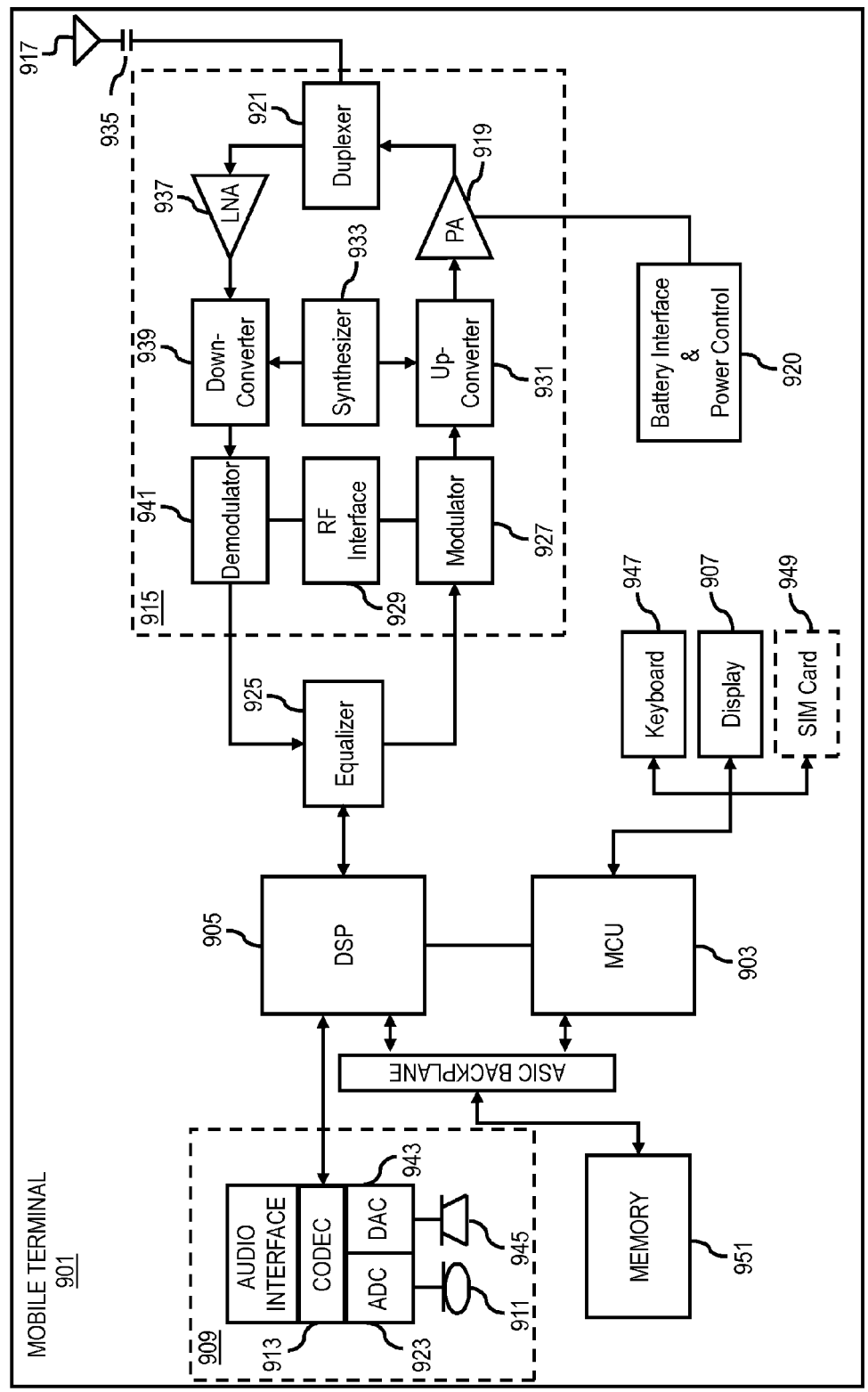
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing authentication using hashed personally identifiable information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing authentication using hashed personally identifiable information. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide authentication using hashed personally identifiable information. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

a receiving at a first node in a network of personally identifiable information associated with a device, a user of the device, or a combination thereof;

a processing of the personally identifiable information to cause, at least in part, a generation of hashed personally identifiable information;

a generating of the hashed personally identifiable information based, at least in part, on at least one salt;

a transmission of the hashed personally identifiable information to one or more second network nodes of the network other than the first node in place of the personally identifiable information for use in one or more operations acting on the transmitted hashed personally identifiable information, the one or more operations comprising authentication operations using the transmitted hashed personally identifiable information;

a processing of the transmitted hashed personally identifiable information to determine uniqueness information of the hashed personally identifiable information, a causing of a replication of the hashed personally identifiable information based on the uniqueness information; and a causing of an initiation of the one or more operations based on the replication and/or the hashed personally identifiable information, wherein the one or more operations include, at least in part, the one or more authentication operations associated with multi-site authentication for one or more services, and wherein the one or more network nodes are associated with respective one or more domains of the one or more services.

2. A method of claim 1, wherein the replication of the hashed personally identifiable information occurs at the one or more network nodes.

3. A method of claim 2, wherein the (1) data and/or (2) information and/or (3) at least one signal are further based, at least in part, on the following:
at least one determination of whether to cause, at least in part, an initiation of the generation, the transmission, or a combination thereof of the hashed personally identifiable information based, at least in part, on one or more privacy policies associated with the one or more domains.

4. A method of claim 1, wherein the (1) data and/or (2) information and/or (3) at least one signal are further based, at least in part, on the following:
an initiation of the one or more operations based, at least in part, on the replication, the hashed personally identifiable information, or a combination thereof.

5. A method of claim 1, wherein the (1) data and/or (2) information and/or (3) at least one signal are further based, at least in part, on the following:
a processing of the hashed personally identifiable information to determine uniqueness information of the hashed personally identifiable information, the personally identifiable information, or a combination thereof, wherein the one or more operations are based, at least in part, on the uniqueness information.

6. A method of claim 5, wherein the uniqueness information is synchronously determined among the network nodes.

7. A method of claim 1, wherein the (1) data and/or (2) information and/or (3) at least one signal are further based, at least in part, on the following:
at least one determination of an authentication request for the one or more operations, wherein the authentication request identifies at least one user identifier of the personally identifiable information, at least one passcode corresponding with the at least one user identifier, or a combination thereof;
a processing of the authentication request to determine an associated hashed identifier from the hashed personally identifiable information, an associated hashed passcode, or a combination thereof based, at least in part, on the at least one user identifier, the at least one passcode, or a combination thereof; and
a transmission of the associated hashed identifier, the associated hashed passcode, or a combination thereof to at least one of the one or more network nodes to determine whether to validate the authentication request.

8. A method of claim 1, wherein the generation of the hashed personally identifiable information is based, at least in part, on a plurality of salts, and wherein the generation of the hashed personally identifiable information includes, at least in part, a plurality of recursive iterations of a hash function.

9. A method of claim 1, wherein the (1) data and/or (2) information and/or (3) at least one signal are further based, at least in part, on the following:
at least one determination of one or more namespaces associated with the personally identifiable information; and
at least one determination of one or more hashing schemes corresponding with the one or more namespaces, wherein the generation of the hashed personally identifiable information is based, at least in part, on the one or more hashing schemes.

10. A method of claim 1, wherein the hashed personally identifiable information includes, at least in part, a one-way-hashed version of the personally identifiable information.

11. An app1aratus comprising:
at least one processor;
and at least one memory including computer program code for one or more programs, the at least one memory and the computer program code configured to, with the at least one processor, cause the apparatus to perform at least the following,
receive at a first node in a network of personally identifiable information associated with a device, a user of the device, or a combination thereof,
process and/or facilitate a processing of the personally identifiable information to cause, at least in part, a generation of hashed personally identifiable information,
generate the hashed personally identifiable information based, at least in part, on at least one salt,
cause, at least in part, a transmission of the hashed personally identifiable information to one or more second network nodes of the network other than the first node in place of the personally identifiable information for use in one or more operations acting on the transmitted hashed personally identifiable information, the one or more operations comprising authentication operations using the transmitted hashed personally identifiable information,
process the transmitted hashed personally identifiable information to determine uniqueness information of the hashed personally identifiable information,
cause a replication of the hashed personally identifiable information based on the uniqueness information, and
cause an initiation of the one or more operations based on the replication and/or the hashed personally identifiable information,
wherein the one or more operations include, at least in part, the one or more authentication operations associated with multi-site authentication for one or more services, and wherein the one or more network nodes are associated with respective one or more domains of the one or more services.

12. An apparatus of claim 11, wherein the replication of the hashed personally identifiable information occurs at the one or more network nodes.

13. An apparatus of claim 12, wherein the apparatus is further caused to:
determine whether to cause, at least in part, an initiation of the generation, the transmission, or a combination thereof of the hashed personally identifiable information based, at least in part, on one or more privacy policies associated with the one or more domains.

14. An apparatus of claim 11, wherein the apparatus is further caused to:
cause, at least in part, an initiation of the one or more operations based, at least in part, on the replication, the hashed personally identifiable information, or a combination thereof.

15. An apparatus of claim 11, wherein the apparatus is further caused to:
process and/or facilitate a processing of the hashed personally identifiable information to determine uniqueness information of the hashed personally identifiable information, the personally identifiable information, or a combination thereof, wherein the one or more operations are based, at least in part, on the uniqueness information.

16. An apparatus of claim 15, wherein the uniqueness information is synchronously determined among the network nodes.

17. An apparatus of claim 11, wherein the apparatus is further caused to:
determine an authentication request for the one or more operations, wherein the authentication request identifies at least one user identifier of the personally identifiable information, at least one passcode corresponding with the at least one user identifier, or a combination thereof,
process and/or facilitate a processing of the authentication request to determine an associated hashed identifier from the hashed personally identifiable information, an associated hashed passcode, or a combination thereof based, at least in part, on the at least one user identifier, the at least one passcode, or a combination thereof; and
cause, at least in part, transmission of the associated hashed identifier, the associated hashed passcode, or a combination thereof to at least one of the one or more network nodes to determine whether to validate the authentication request.

18. An apparatus of claim 11, wherein the generation of the hashed personally identifiable information is based, at least in part, on a plurality of salts, and wherein the generation of the hashed personally identifiable information includes, at least in part, a plurality of recursive iterations of a hash function.

19. An apparatus of claim 11, wherein the apparatus is further caused to:
determine one or more namespaces associated with the personally identifiable information; and
determine one or more hashing schemes corresponding with the one or more namespaces, wherein the generation of the hashed personally identifiable information is based, at least in part, on the one or more hashing schemes.

20. An apparatus of claim 11, wherein the hashed personally identifiable information includes, at least in part, a one-way-hashed version of the personally identifiable information.

* * * * *